April 28, 1925.
N. MILNER
STAKE RETAINER FOR VEHICLES
Filed March 22, 1924
1,535,128
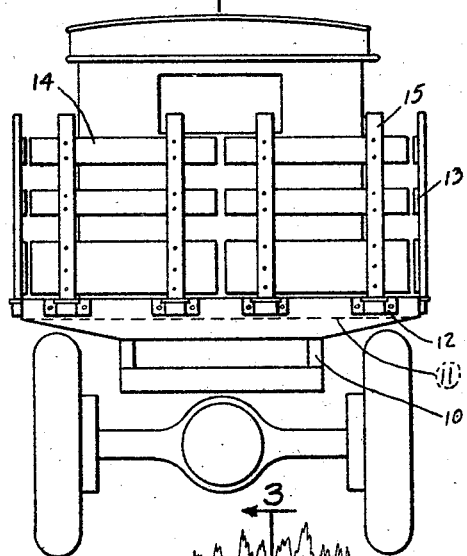
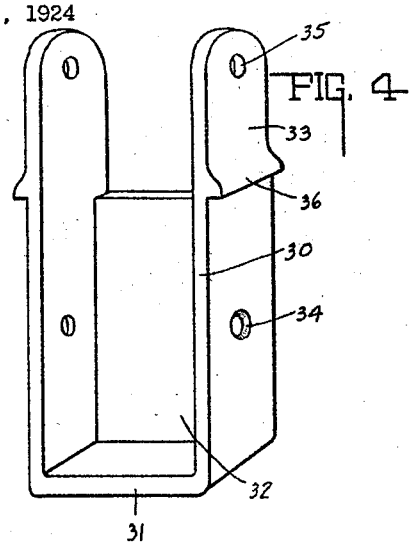
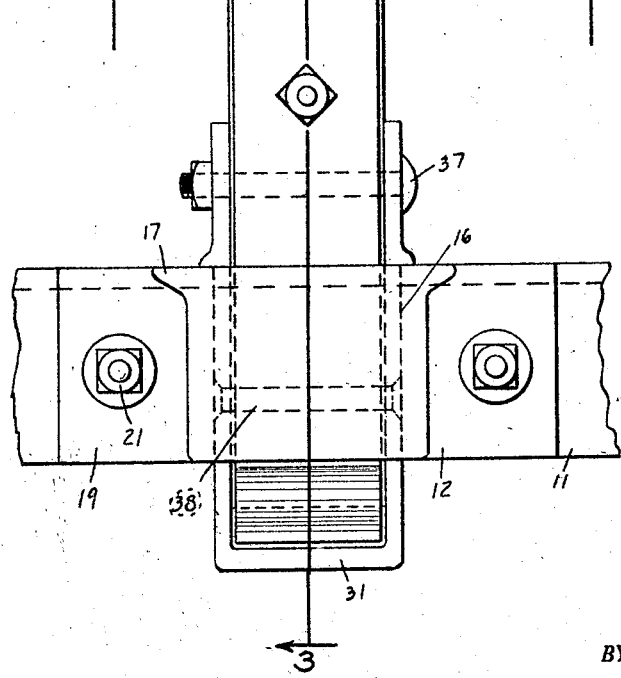
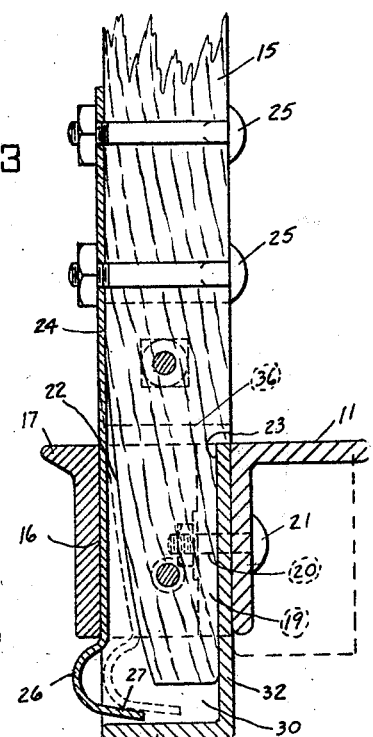
INVENTOR.
NUGENT MILNER.
BY
ATTORNEYS.

Patented Apr. 28, 1925.

1,535,128

UNITED STATES PATENT OFFICE.

NUGENT MILNER, OF EVANSVILLE, INDIANA, ASSIGNOR TO GRAHAM BROTHERS, OF EVANSVILLE, INDIANA, A CORPORATION.

STAKE RETAINER FOR VEHICLES.

Application filed March 22, 1924. Serial No. 701,094.

*To all whom it may concern:*

Be it known that I, NUGENT MILNER, a citizen of Canada, and a resident of Evansville, county of Vanderburg, and State of Indiana, have invented a certain new and useful Stake Retainer for Vehicles; and I do hereby declare that the following is a full, clear, and exact description thereof, reference being had to the accompanying drawings, in which like numerals refer to like parts.

This invention relates to a stake retainer for vehicles.

The chief object of this invention is to provide a retaining connection between a stake and vehicle member supporting the same, which connection is not only adapted to latch the stake to the body, and prevent accidental removal therefrom, due to vehicle bouncing; but is also adapted to prevent excessive wear between the several parts and also to prevent rattling therebetween, as well as to prevent excessive seating movement of the stake.

The chief feature of the invention consists in associating a yieldingly mounted latch with a stake, a stake-receiving socket and an open faced hood, whereby the foregoing object is accomplished.

Other features of the invention consist in the particular construction and arrangement of the several parts; and still other features of the invention will be pointed out more specifically hereinafter.

The full nature of the invention will be understood from the accompanying drawings and the following description and claims:

In the drawings, Fig. 1 is an elevational view of the rear of a truck-type vehicle equipped with side frames including stakes. Fig. 2 is an elevational view of a portion of the vehicle, the socket associated therewith and a single stake in said socket, and illustrates in greater detail the parts shown in Fig. 1. Fig. 3 is a longitudinal sectional view of the same parts shown in Fig. 2 and is taken on the line 3—3 of Fig. 2 and in the direction of the arrows. Fig. 4 is a perspective view of the open faced hood with which the stake is provided.

In the drawings 10 indicates the frame of a vehicle, herein shown of the truck type, provided with a sill in the form of an angle iron 11, and said sill 11 is provided with a plurality of socket-forming brackets 12 at suitable intervals. Herein reference is had particularly to Fig. 1. The vehicle sides 13 are shown composed of an open framework including the planking 14 and the stake and connecting portions 15. In Fig. 1 the truck is also shown provided with the end frames which herein are shown parted medianly of the truck. This particular arrangement is conventional and permits the driver of the truck to have access to either half of the truck from the rear through either half of the tail framework. The sides may be similarly parted. If desired as shown in Fig. 2, the framework may be omitted and the single stakes may be substituted for said framework, i. e., whenever the nature of the load is such that the stakes are more serviceable.

In the drawings particularly as shown in the several Figures 2, 3 and 4, the socket-forming bracket 12 as illustrated includes a socket or pocket-forming portion 16 which is beaded at its upper end, as at 17. Said bracket is suitably secured to the angle iron sill 11 by means of the wing or plate portions 19 of said brackets, and by suitable means associated with the openings 20 in said wing portion. Screws, bolts or rivets herein indicated by the numeral 21 may be equally suitable for such permanent mounting.

The stake herein indicated by the numeral 15 is shown provided with an end tapered or cut away as at 22 and recessed as at 23. A spring clip 24 in the form of a plate or strap is secured to the face of the stake 15 oppositely from the recessed portion 23, by suitable means such as previously indicated and herein the same is indicated by the numeral 25. The main portion of the spring clip 24 is adapted to engage one wall 16 of the socket formed in the bracket. The free end of the spring clip is shown provided with a curved latch portion 26, and said latch portion terminates in a rearward extension 27. It will be apparent, therefore, that the spring clip 24 engages one wall or inner face of the socket 16 to prevent rattling of the stake in the socket and also said spring through the curved or latch portion 26 engages the lower edge of the socket 16 and yieldingly locks the stake to the socket, but permits forcible movement therefrom. The broad idea of this disclosure is illustrated, described and claimed in a co-pending application, Serial No. 685,282, filed January 9, 1924. In addition to the foregoing construction, there is provided an open faced hood which is illustrated clearly in Fig. 4. Herein said open faced hood is shown provided with a pair of parallel sides 30, a connecting end or bottom plate 31 and a backplate 32. The upper extensions 33 of the sides 30 project above the back 32. There is thus formed an open faced hood adapted to receive the end of the stake and be secured suitably thereto. Herein the sides 30 are shown provided with the countersunk openings 34 and the extensions are shown provided with the openings 35. Likewise at the junction between the side and the extension, there is provided an outwardly extending lug or ledge 36.

The open faced hood is adapted to be rigidly secured to the end of the stake 15 by suitable means, such as the bolt and nut construction 37 associated with the extension openings 35 and the rivet 38 associated with the countersunk side openings 34. Said bolt and said rivet pass through the stake 15, and thus securely anchor the hood to the end of the stake.

As shown clearly in Fig. 3, the backplate 32 is seated in the cut away, recessed or slotted portion 23 and forms a flush surface with the stake when rigidly secured thereto. Also as shown clearly in said figure the bottom 31 is positioned below the end of the stake and thus forms a recess or socket between the end of said stake and bottom for receiving the free end 27 of the latch of the anti-rattling spring, as well as a part of the latch portion thereof. As shown clearly by the dotted lines in Fig. 3, the relieved portion 22 of the stake permits the spring to be seatable in the pocket formed by the open faced hood and said relieved portion of the stake when the stake is being inserted into the socket 12.

The invention claimed is:

1. A detachable connection for securing a stake to a vehicle body member, including a socket secured to the body member, a stake having one face relieved and receivable by the socket and extending substantially to the bottom thereof when seated, an open faced hood secured to the stake and projecting beyond the stake end and the socket and with the stake relieved face exposed to the socket through the hood open face, said hood projection and stake end forming a recess therebetween having a portion positioned beneath the socket and providing lateral access thereto, and a strap spring rigidly secured to the stake above the socket engaging portion and having a movable and arcuately curved locking portion normally positioned beneath the socket to engage the lower edge thereof for detachably retaining the stake in the socket and automatically releasing the same to permit forcible removal therefrom.

2. A device of the character described in claim 1 in which said spring normally bears on the adjacent wall of the socket from the top to the bottom thereof for preventing rattling of the stake in the socket.

3. A device of the character described in claim 1 in which said hood has a laterally projecting lug for engaging the upper edge of the socket to limit longitudinal seating movement of the stake therein.

4. A device of the character described in claim 1 in which said spring normally bears on the adjacent wall of the socket from the top to the bottom thereof for preventing rattling of the stake in the socket and said hood has a laterally projecting lug for engaging the upper edge of the socket to limit longitudinal movement of the stake therein.

In witness whereof, I have hereunto affixed my signature.

NUGENT MILNER.